(No Model.)
J. HESSBERGER.
ELECTRIC METER.
No. 574,903.  Patented Jan. 12, 1897.
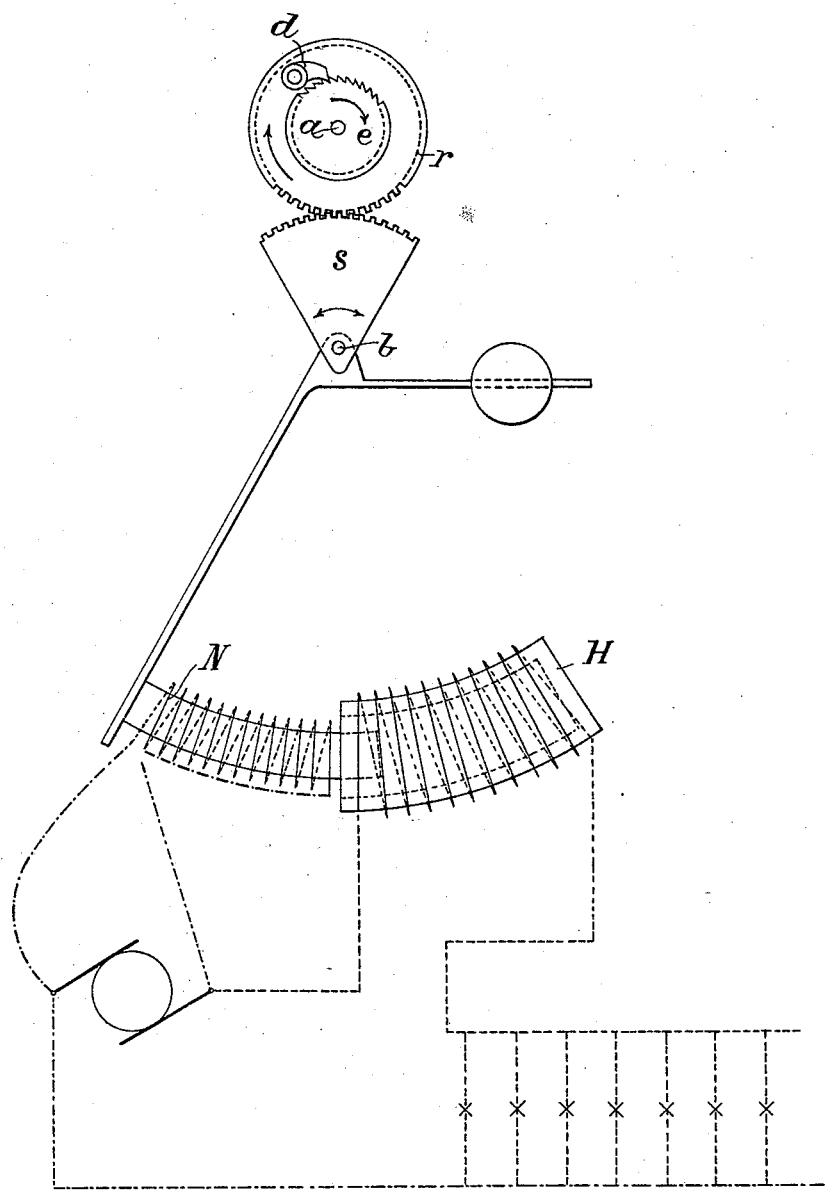
Witnesses
H. van Oldenneel.
E. K. Sturtevant.
Inventor
Johannes Hessberger
by Richards
Attorneys

UNITED STATES PATENT OFFICE.

JOHANNES HESSBERGER, OF NIEDERSEDLITZ, GERMANY.

ELECTRIC METER.

SPECIFICATION forming part of Letters Patent No. 574,903, dated January 12, 1897.

Application filed August 10, 1895. Serial No. 558,930. (No model.)

*To all whom it may concern:*

Be it known that I, JOHANNES HESSBERGER, electrical engineer, a subject of the King of Prussia, German Emperor, residing at Niedersedlitz, near Dresden, in the Kingdom of Saxony, Germany, have invented new and useful improvements in electrical apparatus having movements determined by variations of the electrical resistance of bismuth in a magnetic field, of which the following is a specification.

This invention relates to electrical apparatus, instruments, and machines in which motion is produced by the use of bismuth or alloys of bismuth as conductors of current in an electromagnetic system of fixed and movable conductors, so that an alteration in the resistance and in the current that causes the motion is produced by the action of the lines of magnetic force.

The electrical resistance of bismuth and alloys of bismuth increases within practical limits proportionally to the increase of the strength of the magnetic field. This peculiar property of bismuth may be utilized in a variety of ways.

The accompanying drawing illustrates diagrammatically one application as a wattmeter for continuous or alternating currents in which the variations of resistance of bismuth or alloys of bismuth in a magnetic field are employed for the production of motion, which is transmitted to a counter.

As shown in the drawing, there is a coil H, formed as the arc of a circle traversed by the main current, and there is a shunt-coil N, fixed on a rocking shaft. The main-current coil H is of copper wire. The shunt-coil N is of bismuth wire or an alloy of bismuth. The direction of current in the coils is so arranged that the pivotally-suspended shunt-coil N is drawn into the fixed main-current coil H.

The operation is as follows: When the shunt-coil N is drawn into the main-current coil H, the resistance of the bismuth coil becomes changed, so that the main-current coil can no longer hold in the shunt-coil, and consequently the shunt-coil moves out of the main-current coil to its original position, and then the original conditions in respect of the resistance recur and the action is repeated. Thus the shunt-coil is caused to oscillate, and these oscillations are directly proportional both to the strength of the magnetic field and to the number of watts. Consequently the oscillations are also proportional to the volt-amperes or watts consumed. The oscillations may be transmitted in any suitable manner to an axle which rotates in one direction and works a counter. In the arrangement shown the shaft $b$, on which the shunt-coil N is fixed, has on it a toothed segment $s$, gearing with a wheel $r$, a pawl $d$, which acts on a ratchet-wheel $e$, causing the axle $a$ of the counter to rotate always in one direction.

Having now particularly described and ascertained the nature of my said invention and in what manner the same is to be performed, I declare that what I claim is—

1. An electrical measuring instrument comprising a bismuth or bismuth-alloy conductor arranged in circuit, and a second conductor in circuit and producing a magnetic field, one of said conductors being movable in relation to the other, substantially as described.

2. An electrical measuring instrument for continuous or alternating currents comprising a shunt-coil of bismuth or bismuth-alloy, a main-current coil arranged to receive the bismuth coil said bismuth coil being movably supported and alternately drawn into and moved out of the main-current coil by reason of the variation of the resistance of the bismuth in the magnetic field, and a counter connected with the bismuth coil, substantially as described.

3. An electrical instrument comprising means for producing a magnetic field, a bismuth or bismuth-alloy conductor movable in said field and an indicator connected with said bismuth conductor, substantially as described.

4. An electrical instrument comprising means for producing a magnetic field, and a bismuth or bismuth-alloy conductor in the said field, one of said parts being movable in relation to the other, substantially as described.

In testimony whereof I have signed my name to this specification in the presence of two subscribing witnesses.

JOHANNES HESSBERGER.

Witnesses:
 THOMAS MARCHER,
 HERMANN HESSBERGER.